(No Model.) 4 Sheets—Sheet 4.
L. H. ZEIGLER.
MACHINE FOR ORNAMENTING GLASS ARTICLES.

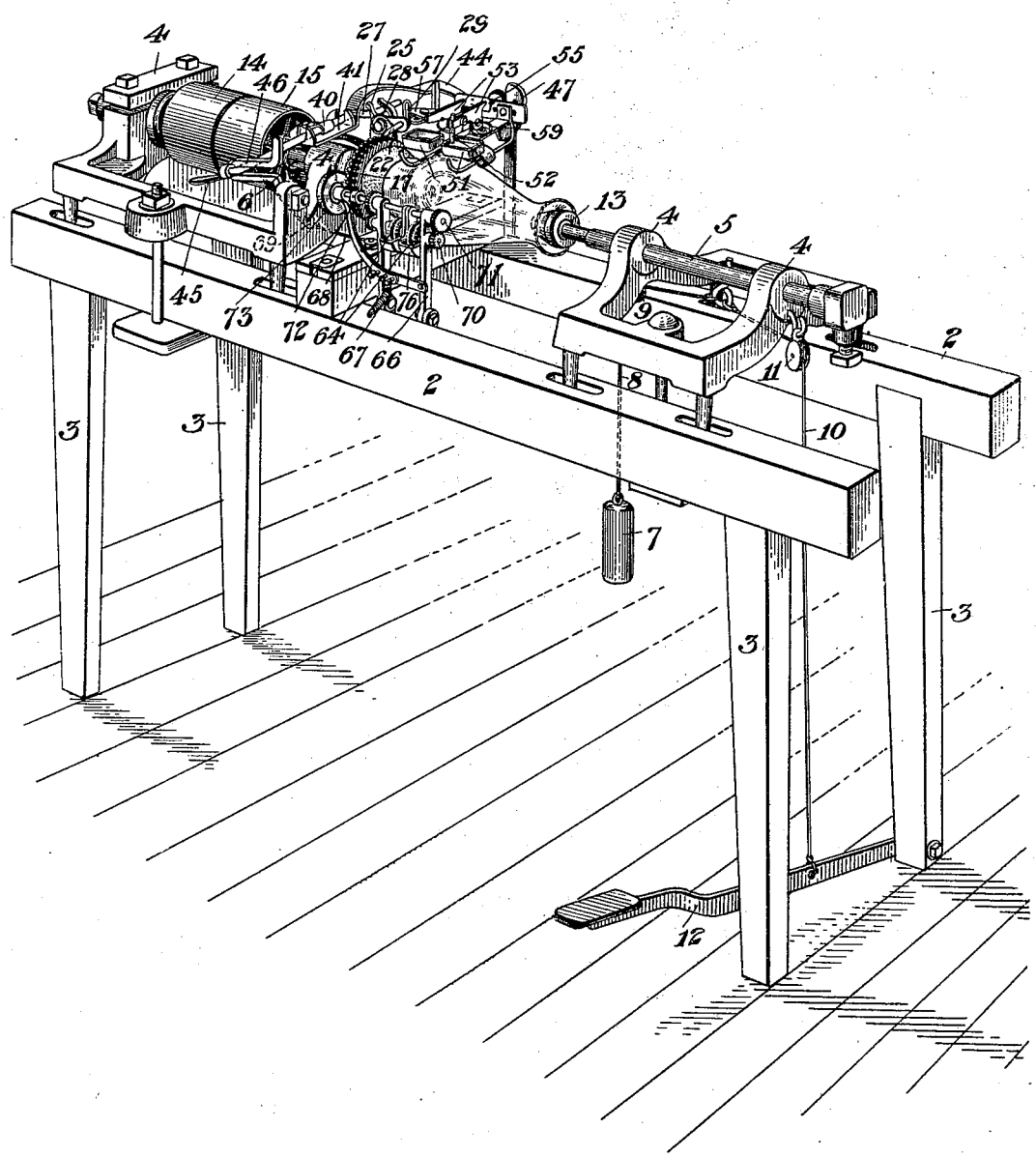

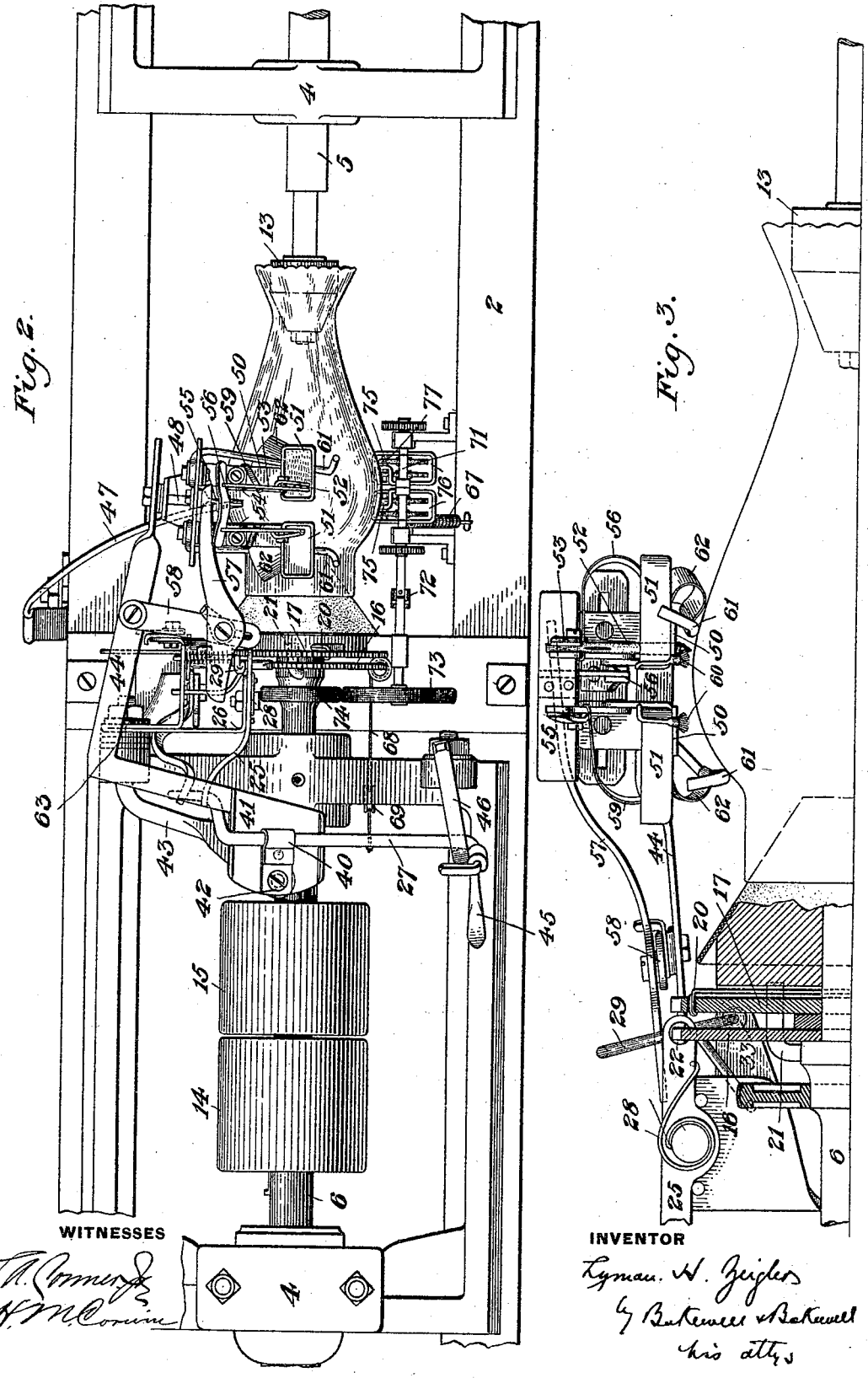

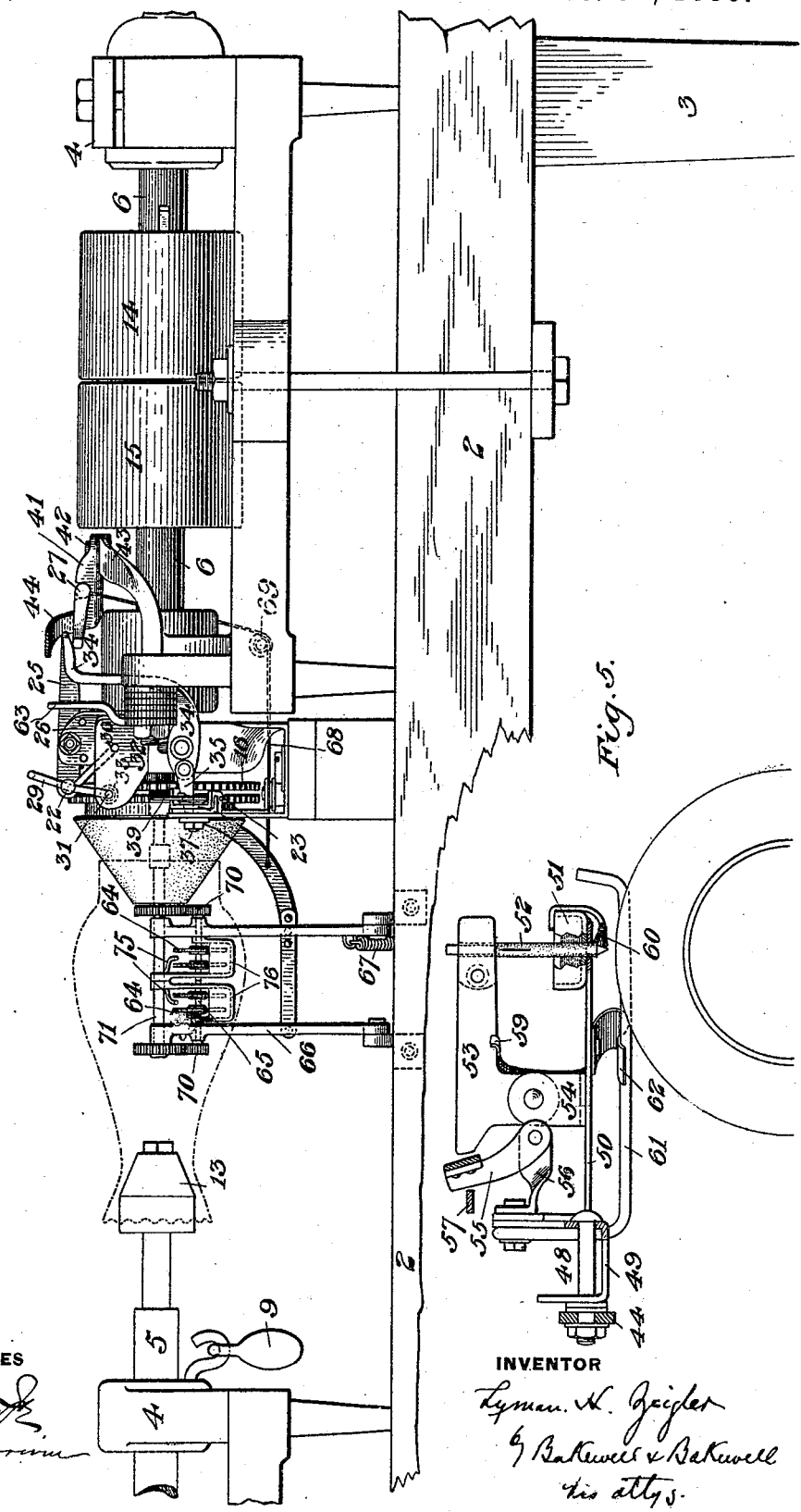

No. 552,461. Patented Dec. 31, 1895.

WITNESSES

INVENTOR

UNITED STATES PATENT OFFICE.

LYMAN HALL ZEIGLER, OF REDKEY, INDIANA, ASSIGNOR TO THE MARIETTA GLASS COMPANY, OF SAME PLACE.

MACHINE FOR ORNAMENTING GLASS ARTICLES.

SPECIFICATION forming part of Letters Patent No. 552,461, dated December 31, 1895.

Application filed June 17, 1895. Serial No. 553,047. (No model.)

*To all whom it may concern:*

Figure 6:
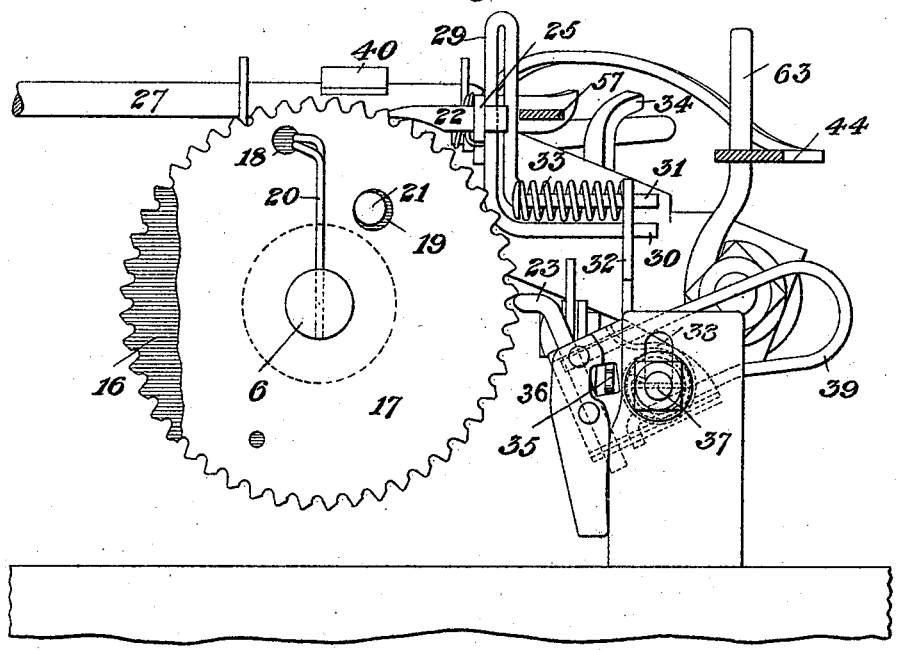
Figure 7:
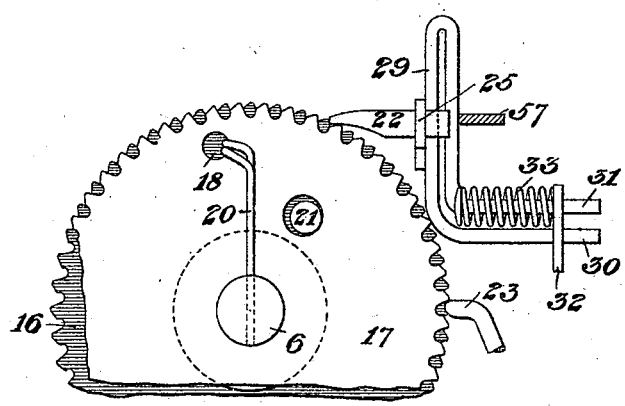

Be it known that I, LYMAN HALL ZEIGLER, of Redkey, in the county of Jay and State of Indiana, have invented a new and useful Improvement in Machines for Ornamenting Glass Articles, of which the following is a full, clear, and exact description, reference being had to the accompanying drawings, forming part of this specification, in which—
Figure 1 is a perspective view of my decorating-machine. Fig. 2 is a top plan view of the same. Fig. 3 is an enlarged side elevation, partly in section, of the dotting mechanism. Fig. 4 is a rear elevation of the machine, partly broken away. Fig. 5 is a detail view of a dotter and its connections, and Figs. 6 and 7 are enlarged end views of the actuating-wheels and connections in different positions.

My invention relates to the decorating of curved surfaces, such as the surfaces of glass chimneys or round glass articles, and is designed to afford a machine which will ornament the surface with dots or bands, or both, in a uniform manner and without the use of skilled labor.

To that end it consists in means for rotating the article past the dotters and automatically stopping the article while the dotter rests thereon, so that the dot is exactly the proper shape and is not elongated or smeared by the turning of the article while the dotter is in contact therewith.

It also consists in means for reciprocating the dotter and lifting it before the further motion of the article, in means for applying a band thereto as the article rotates, and in the combination and arrangement of the parts as hereinafter more fully described and set forth in the claims.
In the drawings, 2 represents the base of my machine resting upon supports 3 and carrying bearings 4 for two shafts 5 and 6. The shaft 5 reciprocates through its bearings, and is normally thrown forward by a weight 7 attached thereto, by a cord 8 passing over a pulley 9. A cord 10, also secured to the shaft, passes over a pulley 11 to a foot-lever 12, by which the shaft is retracted when the article is removed or put in place. Supported within the forward end of this shaft 5 is a rotary mandrel 13 carrying a head which is of suitable shape to receive one end of the article, in this case a lamp-chimney. Secured to the inner-end portion of the other shaft 6, which carries the suitable fast and loose pulleys 14 and 15, is a toothed wheel 16, and inside this wheel is another similar wheel 17, which is loose upon the shaft. In the wheel 17 are provided two holes 18 and 19, into the one of which projects the bent end of a spring 20, secured to the shaft, while into the other elongated or enlarged hole 19 projects a pin 21, secured to the face of the wheel 16. A pawl 22 engages the teeth of the wheel 16, and is arranged to operate the dotters, while a pawl 23 engages the teeth of the wheel 17 and serves to stop this wheel momentarily and thus give the mandrel or head 24 secured thereto an intermittent motion.

The pawl 22 slides back and forth through a horizontal hole in the end of a lever 25, which is pivoted to a standard 26 and projects into the path of the operating-lever 27. The lever 25 is normally held in elevated position, thus raising the pawl out of contact by a coiled spring 28 bearing thereon, Fig. 3; but when its outer end is raised its lower end is correspondingly depressed and the pawl thus engaged with the teeth of the wheel 16. A guide-rod 29 extends vertically through a hole in the pawl, this rod being bent back upon itself and the two ends 30 and 31 passed through holes in a stationary support 32. A coiled spring 33 surrounds one limb of this rod, and bearing against the support normally throws the pawl forward and holds it in engagement with the teeth of the wheel 16, when it is lowered into contact therewith by the operating-lever 27. The end of this lever 27 contacts with the under side of another lever 34, which it raises at the same time with lever 25, and such lever 34 (shown in Fig. 4) carries at its other end an adjustable finger 35, which projects through a swinging frame 36, pivoted to the frame at 37, as shown in Fig. 6. This frame is normally held retracted or swung back by a coiled spring 38, and it contains the sliding pawl 23, which is normally thrust out by a bent leaf-spring 39 bearing thereon.

The operating-lever 27 is carried in bearings 40 upon a horizontally-swinging plate 41, which is pivoted at 42 to a standard 43 and carries a bent or curved support 44 for the dotting mechanism proper. The end of the lever 27 is provided with a handle 45 and extends through a guide 46 in the form of a bent rod, the dotting mechanism being brought into place by moving the lever horizontally to the left within this guide, thus swinging the plate 41, and the pawls 22 and 23 then being thrown into engagement with the wheels 16 and 17 by rotating the lever, whose end is hooked or bent over the guide and moves around the bent portion thereof as the lever rotates.

The support 44 moves upon a curved stationary rest 47, which is secured to the frame, and to its end is loosely secured by a bolt 48 a U-shaped plate 49, Fig. 5, which is allowed by the loose connection to oscillate slightly sidewise. To this plate 49 are adjustably secured two arms 50, carrying at their ends the receptacles 51 for the mixture to be applied to the glass chimney or other article. Through holes in the bottoms of these receptacles project the dotters 52, which project downwardly from levers 53, pivoted to supports 54 upon the arms 50. A buffer 55 is pivoted to a support 56 upon the plate 49 and is adapted to contact with the rearwardly-projecting arms of levers 53. This buffer is actuated by a lever 57, which is pivotally supported upon an extension 58 of the support 44, and which extends past and is contacted with by the guide-rod 29, Fig. 6, which rod is moved back and forth by the pawl 22.

Each lever is held normally in raised position by a leaf-spring 59 and is tipped down by the lever 57, thus bringing the dotters into contact with the article.

Each dotter consists of a wooden post or pin, which is cut into two parts and these parts connected by a rubber tube having longitudinal side slits to make it more yielding in its action as it impinges upon the surface of the article.

Secured to each receptacle 51 is a brush 60, which projects into the path of the dotter and removes the surplus therefrom. Two rests 61 are provided in the form of wires secured to the plate 49, which rests are held against the article by bent springs 62, secured to the plates 50.

The action of the portion of the apparatus above described is as follows: The shaft 5 being retracted, the article is placed in position, and the foot-lever being released is held between the mandrels by the weight 7. The operating-lever being moved horizontally to the left, the dotting mechanism is brought into position above the glass, it being stopped in proper position by a fixed post 63, against which the support 44 strikes. The lever 27 then being rotated, the pawls 22 and 23 are pushed into engagement with the wheels 16 and 17, both of which rotate toward such pawls. The wheel 16 being secured to the driven shaft 6, as it rotates from the position of Fig. 6 causes the pawl 22 to reciprocate rapidly back and forth, and thus, through lever 57 and buffer 55, give a quick up-and-down motion to the dotters. During the backward movement of the pawl 22 and at the moment the dotters rest upon the article the pawl 23 holds the wheel 17 stationary and the article is consequently at rest, the spring 39 being stronger than the spring 20, which tends to throw the pawl 23 back. When, however, the pin 21 strikes the other edge of the hole in the wheel 17, the shaft then forces the pawl 23 back and the wheel 17 and article rotate one tooth, this taking place while the dotters are raised, the pawl 22 having moved forward to the next tooth of the wheel 16. In this way the constantly-rotating shaft 6 gives an intermittent motion to the article at periods when the dotters are raised, and thus the dotter makes a sharp clear impression, the article being stationary.

To produce bands upon the article, I employ wheels 64, which are secured to a shaft 65, having bearings in a frame 66. This frame is hinged to the main frame and is normally retracted by a spring 67, it being forced forward into position by a cord 68, which passes over a pulley 69 and is attached to the lever 27, which moves the frame as the lever is pushed to the left. The shaft 65 is provided with pinions 70, intermeshing with similar toothed wheels upon a shaft 71, having a universal joint 72 therein, and driven by a friction-wheel 73, bearing upon a similar wheel 74 upon the shaft 6. Rests 75 are provided to bear upon the article, and the wheels 64 rotate in troughs 76 containing the material to be applied to the article. Cross-wires 77 are provided in these troughs to scrape the surplus from the applying-wheels. It is apparent that when the frame is thrown forward as the article rotates the wheels will apply the ornamenting material thereto in the form of a band.

The material which I prefer to employ with glass articles is hydrofluoric acid mixed up with flour to form a paste, the acid etching the article, which is then dipped into water to remove the paste. Enamel, or any other substance desired, may, however, be applied in a similar manner.

It is apparent that the dotters may be applied to the top, side, or bottom portion of the article. When applied to the bottom a liquid may be used, such as diluted hydrofluoric acid, since there is no tendency of the applied fluid to run on the surface before it is dried. In this case the dotter may alternately rise above and drop below the surface of the fluid in the receptacle, it being applied to a two-armed lever or other suitable means for operating it.

The dotters and band devices may be used separately or on different machines, and may be one or more in number and arranged to ornament the article wherever desired. Any desired shape may be given to the dotter.

Other means for giving an intermittent motion to the article may be used, and many other variations in the form and arrangement of the parts may be made without departing from my invention, since

What I claim is—

1. An ornamenting machine for curved surfaces comprising means for giving an intermittent rotatory motion to the article, material applying mechanism having a rest arranged to bear upon the article, and means for operating said mechanism while the article is stationary; substantially as described.

2. An ornamenting machine for curved surfaces comprising a constantly driven shaft, a mandrel arranged to drive the article, a connection between the shaft and mandrel arranged to actuate the same intermittently, material applying mechanism having a rest bearing upon the article, and means for operating said mechanism while the article is stationary; substantially as described.

3. An ornamenting machine for curved surfaces comprising a constantly driven shaft, a mandrel arranged to drive the article, a connection between the shaft and mandrel arranged to actuate the same intermittently, material applying mechanism having a rest bearing upon the article and connected to the shaft, and means for operating said mechanism while the article is stationary; substantially as described.

4. In an ornamenting machine, a driven shaft having a toothed wheel thereon, a dotting mechanism, a pawl engaging the wheel and arranged to drive said dotting mechanism, a second wheel carrying a mandrel for driving the article, and a connection between the two wheels arranged to drive the mandrel supporting wheel intermittently; substantially as described.

5. In an ornamenting machine, a driven shaft having a toothed wheel thereon, a dotting mechanism, a pawl engaging the wheel and arranged to drive said dotting mechanism, a second wheel carrying a mandrel for driving the article, a spring pawl arranged to hold the second wheel, and a loose connection between the two wheels; substantially as described.

6. In an ornamenting machine, a mandrel arranged to rotate the article intermittently, a dotter arranged to contact with the article while at rest, and a receptacle between the article and dotter and through which the dotter moves; substantially as described.

7. In an ornamenting machine, a driven shaft having a toothed wheel thereon, a dotting mechanism, a pawl engaging the wheel and arranged to drive said dotting mechanism, a second wheel carrying a mandrel for driving the article, a spring pawl arranged to hold the second wheel, a loose connection between the two wheels, and a lever arranged to throw the pawls into engagement with the wheels; substantially as described.

8. In an ornamenting machine, a driven shaft having a toothed wheel thereon, a dotting mechanism, a pawl engaging the wheel and arranged to drive said dotting mechanism, a second wheel carrying a mandrel for driving the article, a spring pawl arranged to hold the second wheel, a loose connection between the two wheels, and a lever arranged to move the dotting mechanism into position and throw the pawls into engagement with the wheels; substantially as described.

9. An ornamenting machine having means for clamping and intermittently rotating the article, a dotting mechanism arranged to act intermittently, and rests arranged to bear upon the article and hold the dotters at a uniform distance therefrom; substantially as described.

10. An ornamenting machine having means for clamping and rotating the article, a wheel rotating in a trough and arranged to apply material to the article as it rotates, and a rest arranged to bear upon the article and hold the wheel at the same distance therefrom during its rotation; substantially as described.

In testimony whereof I have hereunto set my hand this 12th day of June, 1895.

LYMAN HALL ZEIGLER.

Witnesses:
DELL DRAGOO,
O. O. WILLIAMSON,
FRED WOLTJIN.